US012623568B2

(12) United States Patent
Hao et al.

(10) Patent No.: US 12,623,568 B2
(45) Date of Patent: May 12, 2026

(54) APPARATUS AND METHOD OF BI-DIRECTIONAL POWER TRANSFER BETWEEN VEHICLE AND OUTSIDE SOURCE WITH DECOUPLED STRUCTURE

(71) Applicant: GM Global Technology Operations LLC, Detroit, MI (US)

(72) Inventors: Lei Hao, Troy, MI (US); Suresh Gopalakrishnan, Troy, MI (US); Peng Peng, Columbus, OH (US); Dongxu Li, Troy, MI (US); Chandra S. Namuduri, Troy, MI (US); Muhammad Hussain Alvi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 646 days.

(21) Appl. No.: 18/160,197

(22) Filed: Jan. 26, 2023

(65) Prior Publication Data

US 2024/0253517 A1      Aug. 1, 2024

(51) Int. Cl.
| | |
|---|---|
| *H02J 7/00* | (2026.01) |
| *B60L 15/00* | (2006.01) |
| *B60L 55/00* | (2019.01) |
| *H02J 3/32* | (2006.01) |
| *H02M 7/00* | (2006.01) |

(52) U.S. Cl.
CPC ............. *B60L 55/00* (2019.02); *B60L 15/007* (2013.01); *H02J 3/322* (2020.01); *H02M 7/003* (2013.01)

(58) Field of Classification Search
None
See application file for complete search history.

(56) References Cited

U.S. PATENT DOCUMENTS

2011/0204851 A1\*   8/2011   Manotas, Jr. ........... B60L 55/00
                                                     320/128

OTHER PUBLICATIONS

Hao et al.; "High Power Density Universal Vehicle Charger"; U.S. Appl. No. 17/746,139, filed May 17, 2022.

\* cited by examiner

*Primary Examiner* — Arun C Williams
(74) *Attorney, Agent, or Firm* — CANTOR COLBURN LLP

(57)      ABSTRACT

An electric vehicle includes a drive system which operates a method of transferring power between the vehicle and an external power grid. The drive system includes a battery, a rectifier, and a processor. The processor is configured to connect the rectifier between an alternating current (AC) port of an outlet of an external power grid and the battery, the rectifier configured to convert between an AC power at the AC port on a grid side of the rectifier and a direct current (DC) power at a vehicle side of the rectifier in order to transfer power bi-directionally between the external power grid and the battery.

20 Claims, 14 Drawing Sheets

1500

1502

1504

1506

1508

1510

1512

APPARATUS AND METHOD OF BI-DIRECTIONAL POWER TRANSFER BETWEEN VEHICLE AND OUTSIDE SOURCE WITH DECOUPLED STRUCTURE

INTRODUCTION

The subject disclosure relates to connections between electric vehicles and power grids and, in particular, to a system and method for transferring power bi-directionally between an electric vehicle and a power grid.

An electric vehicle requires charging from time to time. Charging stations are available for charging the electric vehicle using alternating current (AC) and direct current (DC). Circuitry that accommodates both types of charging stations can take up space. Accordingly, it is desirable to provide an efficient and small circuit that can accommodate both types of charging.

SUMMARY

In one exemplary embodiment, a method of transferring power between a vehicle and an external power grid is disclosed. A rectifier is connected between an alternating current (AC) port of an outlet of the external power grid. Power is converted between an AC power at the AC port on a grid side of the rectifier and a direct current (DC) power at a vehicle side of the rectifier to transfer power bi-directionally between the external power grid and the vehicle.

In addition to one or more of the features described herein, wherein the vehicle further includes a first inverter, a winding machine, and a second inverter for DC power transfer, the method further includes connecting the rectifier to the first inverter to use the first inverter, the winding machine, and the second inverter for AC power transfer. The method further includes disconnecting the rectifier from the AC port and connecting the first inverter to a DC port of the outlet for DC power transfer. Wherein the winding machine is an electric motor of the vehicle, the method further includes disengaging the electric motor from the vehicle for power transfer. The method further includes connecting a drive system of the vehicle between the AC port and the first inverter and using an inverter of the drive system as the rectifier and a machine winding of the motor drive as an inductor. In an embodiment in which the inverter of the motor drive is a multi-phase inverter, the method further includes operating the inverter of the motor drive in one of a three-phase configuration and a single-phase configuration.

In another exemplary embodiment, a drive system of an electric vehicle is disclosed. The drive system includes a battery, a rectifier, and a processor. The processor is configured to connect the rectifier between an alternating current (AC) port of an outlet of an external power grid and the battery, the rectifier configured to convert between an AC power at the AC port on a grid side of the rectifier and a direct current (DC) power at a vehicle side of the rectifier in order to transfer power bi-directionally between the external power grid and the battery.

In addition to one or more of the features described herein, the drive system further includes a first inverter, a winding machine and a second inverter for DC power transfer and the processor is further configured to connect the rectifier between the AC port and the first inverter to allow AC power transfer using the first inverter, the winding machine, and the second inverter. The processor is further configured to disconnect the rectifier from the AC port and connect the first inverter to a DC port of the outlet to allow DC power transfer. In an embodiment, the winding machine is an electric motor of the vehicle, and the processor is further configured to disengage the electric motor from the vehicle for power transfer. The drive system second drive system located in series between the AC port and first inverter, wherein an inverter of the second drive system is used as the rectifier and a machine winding of the second drive system is used as an inductor. The inverter of the second drive system is a multi-phase inverter operated in one of a three-phase configuration and a single-phase configuration. The drive system further includes one of a first inverter coupled to the rectifier and a matrix converter in lieu of the rectifier and the first inverter.

In yet another exemplary embodiment, an electric vehicle is disclosed. The electric vehicle includes a battery, a rectifier, and a processor. The processor is configured to connect the rectifier between an alternating current (AC) port of an outlet of an external power grid and the battery, the rectifier configured to convert between an AC power at the AC port on a grid side of the rectifier and a direct current (DC) power at a vehicle side of the rectifier in order to transfer power bi-directionally between the external power grid and the battery.

In addition to one or more of the features described herein, the electric vehicle further includes a first inverter, a winding machine and a second inverter for DC power transfer and the processor is further configured to connect the rectifier between the AC port and the first inverter to allow AC power transfer using the first inverter, the winding machine, and the second inverter. The processor is further configured to disconnect the rectifier from the AC port and connect the first inverter to a DC port of the outlet to allow DC power transfer. In an embodiment, the winding machine is an electric motor of the vehicle, and the processor is further configured to disengage the electric motor from the vehicle for power transfer. The electric vehicle further includes a drive system located in series between the AC port and the first inverter, wherein an inverter of the drive system is used as the rectifier and a machine winding of the drive system is used as an inductor between the AC port and the rectifier. The inverter of the drive system is a multi-phase inverter operated in one of a three-phase configuration and a single-phase configuration. The electric vehicle further includes one of a first inverter coupled to the rectifier and a matrix converter in lieu of the rectifier and the first inverter.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
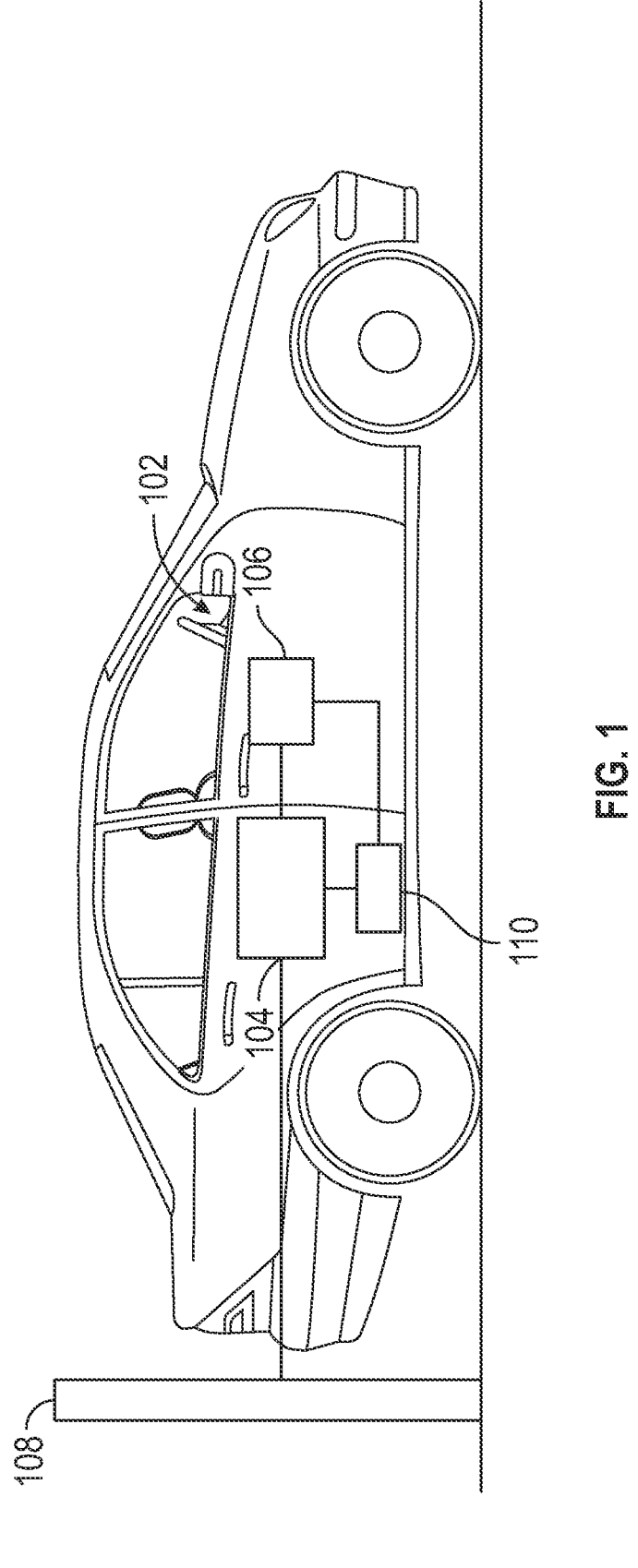
FIG. 1 shows an electric vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an electric vehicle 100. The electric vehicle 100 includes an electrical system 102 having a drive system 104 and an electric motor 106 which operates using power provided by the drive system. As shown in FIG. 1, the electric vehicle 100 is shown plugged into an external power grid 108. The external power grid 108 can be a home, a residence, an office, a charging station, etc. It is noted that the external power grid 108 can include more than a power source but can also include other electric components that are typically powered by the external power grid 108. For example, if the external power grid 108 is a home or residence, the electric components can include lights, televisions, computers, clocks, appliances such as washer/dryer, electric stove, refrigerator, etc. Power can flow between the external power grid 108 and the electric vehicle 100 in either direction (i.e., bi-directionally). Thus, the external power grid 108 can be used to charge the drive system 104. Alternatively, the drive system 104 can be used to charge the external power grid 108 or to provide power to one or more of the electrical components (e.g., washer/dryer) of the external power grid 108. It is to be understood that more the electric vehicle 100 can have more than one electric motor and each electric motor can have an associated drive system.

The electric vehicle 100 further includes a controller 110. The controller 110 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 110 may include a non-transitory computer-readable medium that stores instructions which, when processed by one or more processors of the controller 110, implement a method of controlling an operation for the drive system 104.

Figure 2:
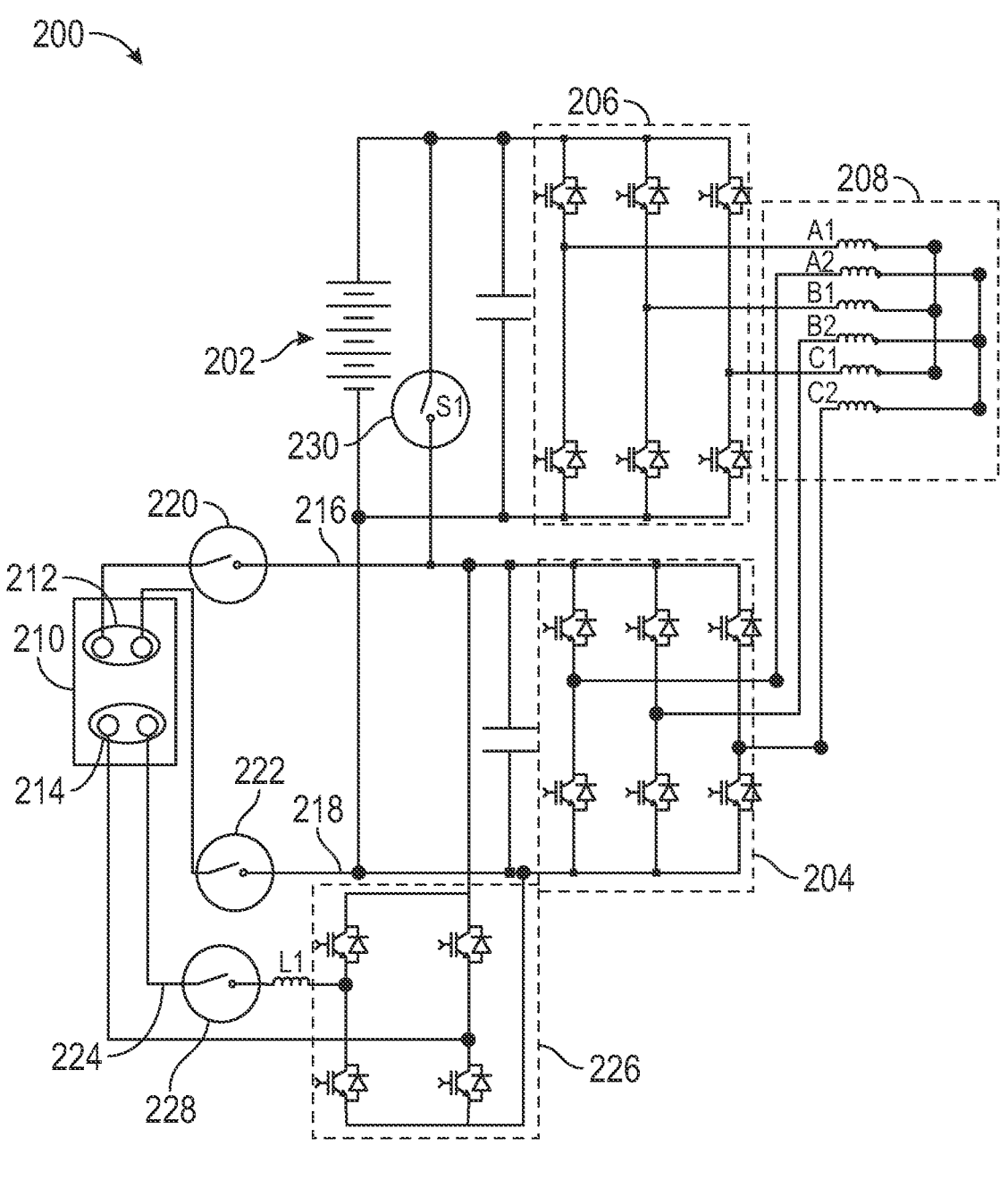
FIG. 2 shows a drive circuit of a drive system of the electric vehicle, in an embodiment.

FIG. 2 shows a drive circuit 200 of the drive system 104 of the electric vehicle 100, in an embodiment. The drive circuit 200 includes a power source or battery 202, a first inverter 204, a second inverter 206 and a winding machine 208. The first inverter 204 and the second inverter 206 are electrically separated from each other and can be powered using separate power modules and drivers. The first inverter 204 and the second inverter 206 each include a plurality of transistors or MOSFETs suitable for conversion between direct current (DC) and alternating current (AC). The winding machine 208 includes windings that are separated into two electrically isolated winding groups. Each winding group has its own neutral connection. Both winding groups share the same stator core and have the same rotor. The windings can be electromagnetically symmetric about the winding machine to avoid any unbalance, to increase ease of control, etc., but can be electromagnetically unsymmetric about the winding machine in other embodiments. The winding machine can be a wound-field synchronous machine, synchronous reluctance machine, etc.

The first inverter 204 can be used to convert between DC power at the external power grid 108 and AC power at the electric motor 106. The second inverter 206 can be used to convert between DC power at the battery 202 to AC power at the electric motor 106. The drive circuit 200 can be coupled to the external power grid 108 via a universal charger 210, which is an outlet of the external power grid that includes both a direct current port (DC port 212) and an alternating current port (AC port 214). The winding machine 208 is incorporated within the electric motor 106.

The drive circuit 200 includes a high voltage DC bus 216 for connecting to a high voltage socket of the DC port 212 and a low voltage DC bus 218 for connecting to a low voltage socket of the DC port 212. A first DC port switch 220 controls a connection between the DC port 212 and the high voltage DC bus 216. A second DC port switch 222 controls a connection between the DC port 212 and the low voltage DC bus 218. An AC bus 224 extends between the AC port 214 and a front-end rectifier 226. An AC port switch 228 on the AC bus 224 controls a connection between the AC port 214 and the front-end rectifier 226. An inductor (L1) can be disposed on the AC bus 224. The front-end rectifier 226 decouples AC/DC power transfer between the AC port 214 and the other components of the drive circuit 200, such as the first inverter 204.

A battery contact switch 230 is located between the battery 202 and the high voltage DC bus 216. The battery contact switch 230 can be turned on (closed) during a drive mode (to operate the electric vehicle 100) and can be either off or on (open or closed) during a charging mode. As shown in FIG. 2, the front-end rectifier 226 is a single-phase rectifier. However, this is not meant to be a limitation of the invention.

Figure 3:
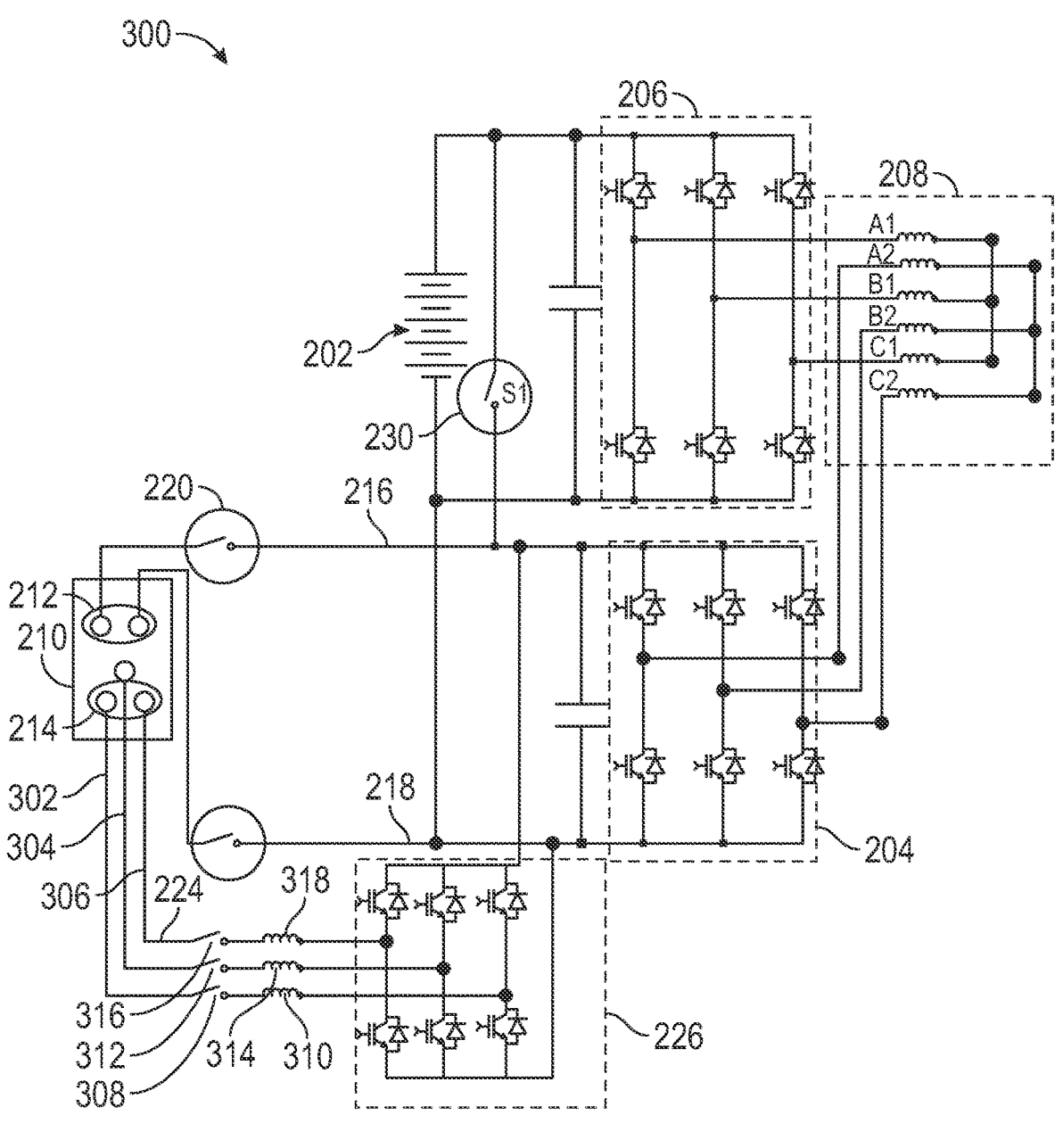
FIG. 3 shows an alternative drive circuit in which an AC port connects to a front-end rectifier via a three-phase interface.

FIGS. 3-6 shows the drive circuit 200 in various alternative embodiments. FIG. 3 shows an alternative drive circuit 300 in which the AC port 214 connects to the front-end rectifier 226 via a three-phase interface including a first bus 302, second bus 304 and third bus 306. The first bus 302 includes a first switch 308 and a first inductor 310. The second bus 304 includes a second switch 312 and a second inductor 314. The third bus 306 includes a third switch 316 and a third inductor 318.

Figure 4:
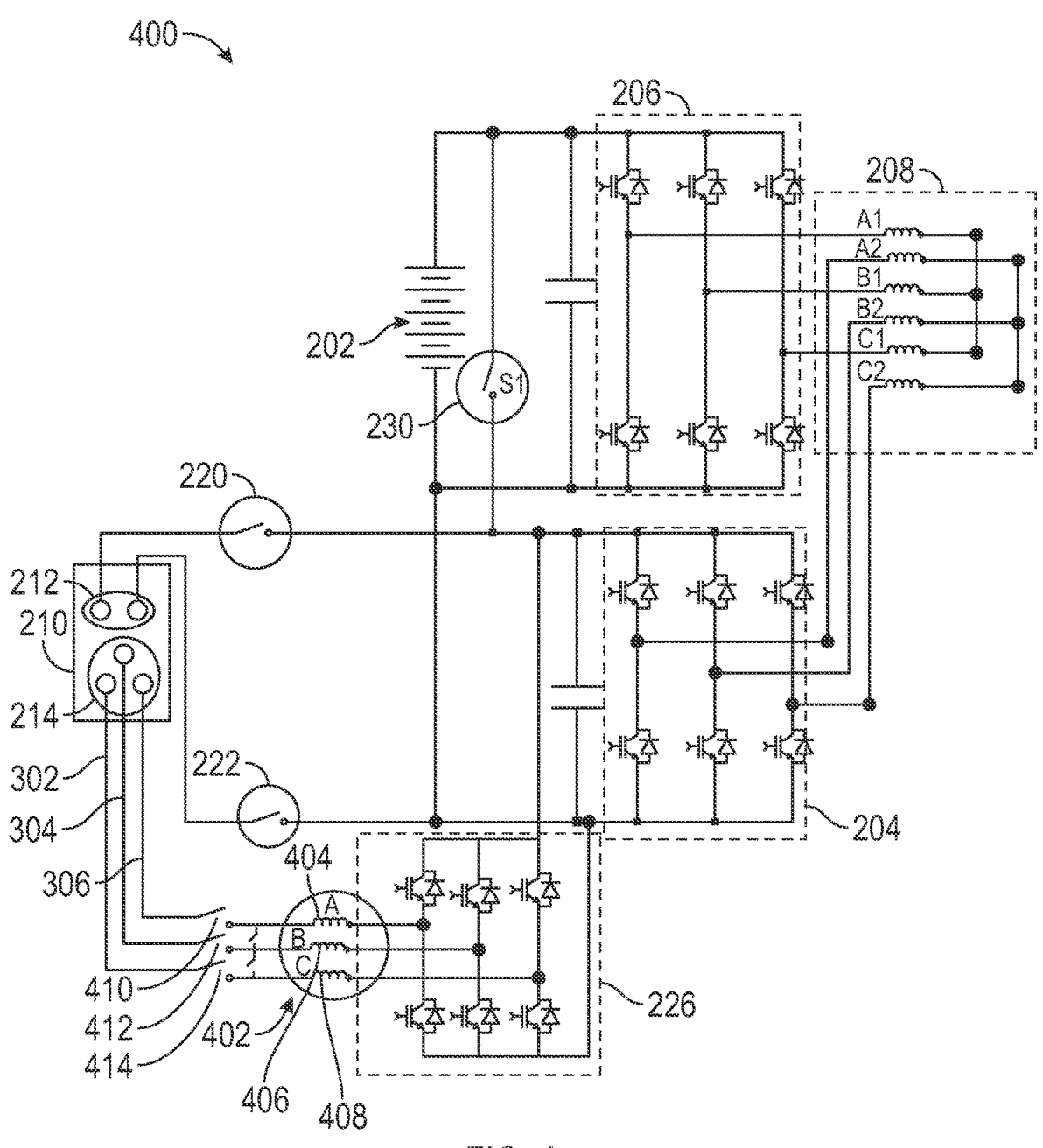
FIG. 4 shows an alternative drive circuit including an electric machine between the front-end rectifier and the AC port, in a three-phase configuration.
Figure 5:
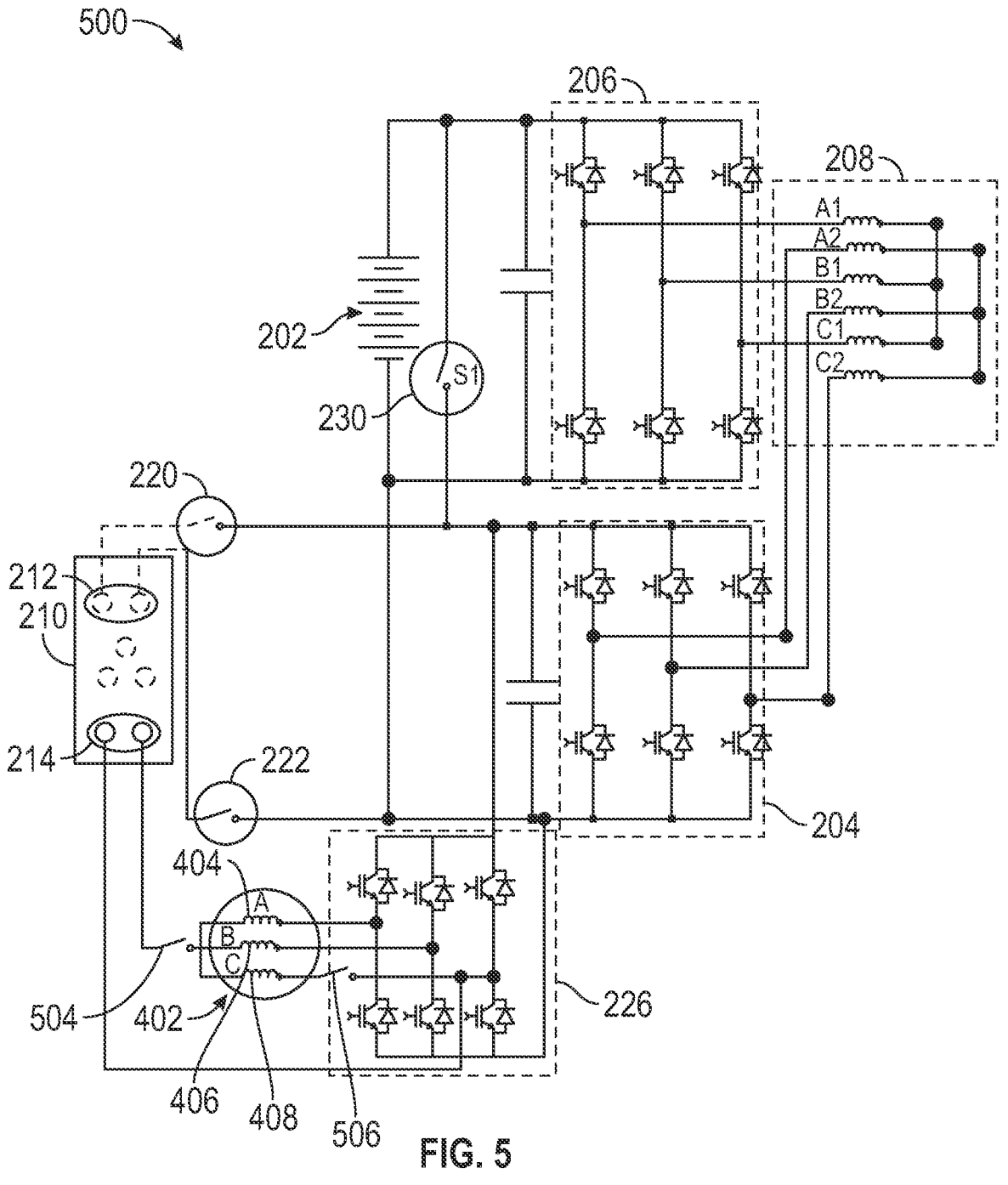
FIG. 5 show an alternative drive circuit in which the electric machine between the front-end rectifier and the AC port is in a first single-phase configuration.
Figure 6:
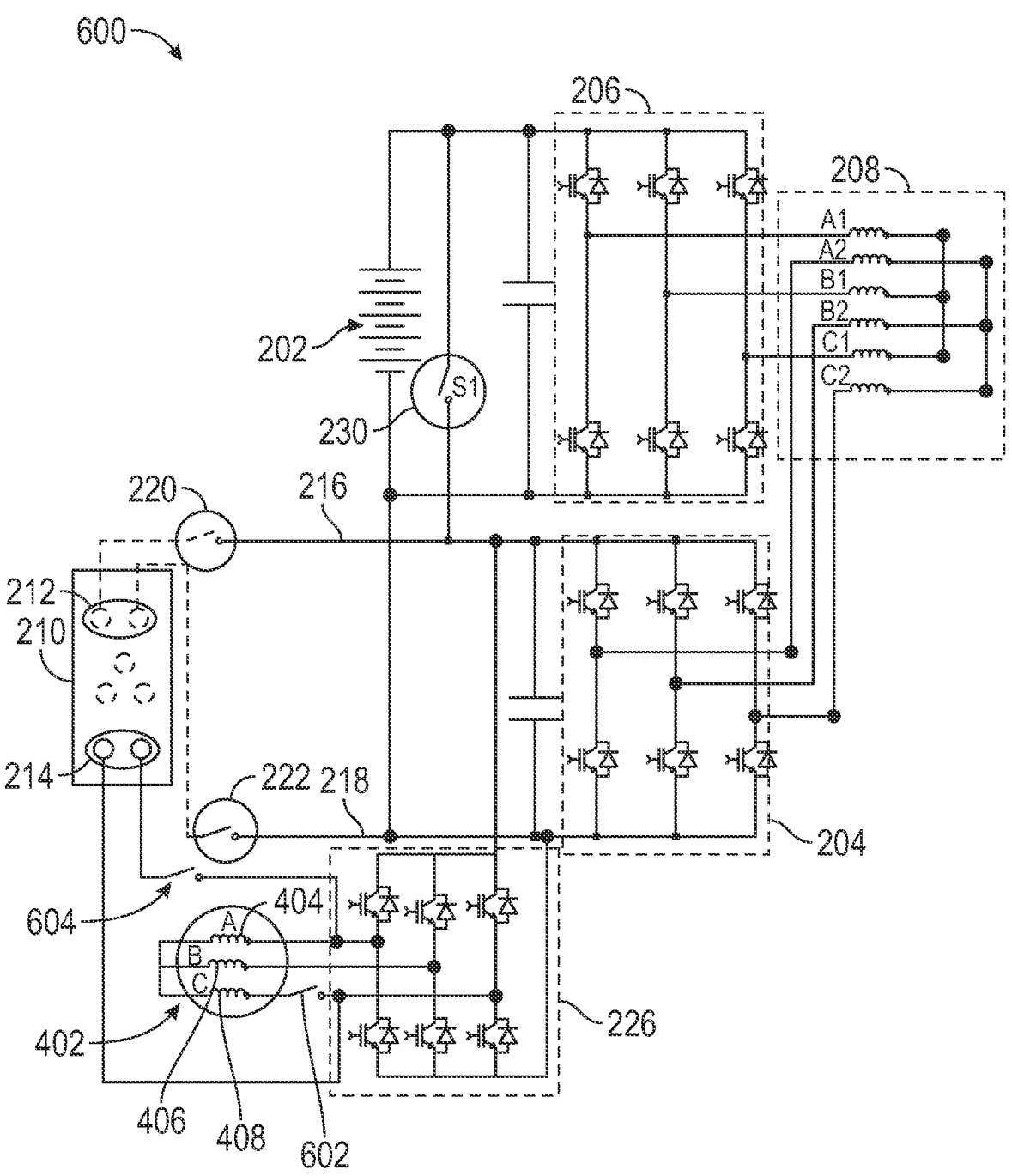
FIG. 6 shows an alternative drive circuit in which the electric machine between the front-end rectifier and the AC port is in a second single-phase configuration.

In various embodiments, the first inverter 204, second inverter 206 and winding machine 208 operate as an electrical system for a first motor drive (first drive system) of the vehicle 100. In FIGS. 4-6, a second motor drive (second drive system) of the electric vehicle 100 can be used to achieve a similar function as the front-end rectifier 226 plus the inductors 310, 314, 318 in FIG. 3. Three phase machine windings of the second motor drive can be used as the inductors 310, 314 and 318 and an inverter of the second motor drive can be used as the front-end rectifier 226.

FIG. 4 shows an alternative drive circuit 400 including an electric machine 402 between the front-end rectifier 226 and the AC port 214, in a three-phase configuration. The electric machine 402 includes three winding branches 404, 406 408. Switches 410, 412 and 414 connect each of the three winding branches 404, 406, 408, respectively, of the electric machine 402 to outlets of the AC port 214. When the switches 410, 412, 414 are closed, the electric machine 402 can be operated off of the AC power transferred between the AC port 214 and the front-end rectifier 226. Disconnect switches between the three winding branches 404, 406, 408 can be opened to disconnect a neutral connection between the three winding branches 404, 406, 408 during a power transfer operation and can be closed when the electric vehicle is operating in a propulsion mode, FIG. 5 show an alternative drive circuit 500 in which the electric machine 402 between the front-end rectifier 226 and the AC port 214 is in a first single-phase configuration. A first switch 504 is located between the AC port 214 and the upstream ends of the three branches 404, 406, 408 of the electric machine 402. A second switch 506 connects a downstream end of the electric machine 402 back to the AC port 214. When the first switch 504 and second switch 506 are closed, the electric machine 402 can be operated with all three branches 404, 406, 408 tapped to one phase.

FIG. 6 shows an alternative drive circuit 600 in which the electric machine 402 between the front-end rectifier 226 and the AC port 214 is in a second single-phase configuration. A first switch 604 is connected between the AC port 214 and a first branch 404 and a second switch 606 is connected between the AC port 214 and a third branch 408 The first switch 604 and the second switch 606 are closed to operate the electric machine 402 connected to a neutral point.

Figure 7:
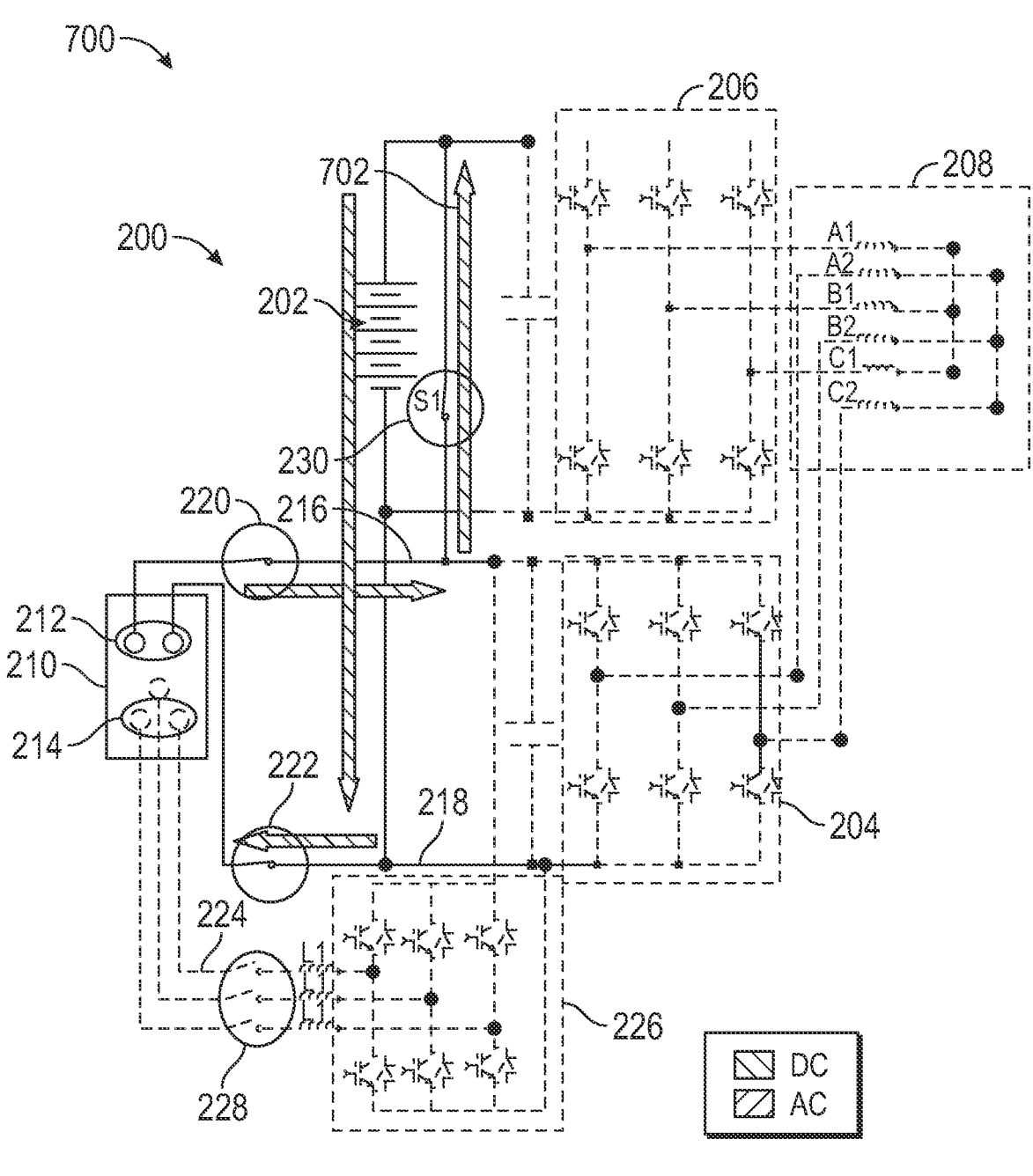
FIG. 7 shows a first DC configuration of the drive circuit for transferring power between the battery and the universal charger via the DC port.

FIG. 7 shows a first DC configuration 700 of the drive circuit 200 for transferring power between the battery 202 and the universal charger 210 via the DC port 212. The controller 110 or a processor can control the configuration of the switches to select the first DC configuration 700. The controller 110 can select the DC configuration when DC power transfer is desired and when the voltage of the battery 202 is the same as the voltage at the DC port 212. In the first DC configuration 700, the first DC port switch 220, second DC port switch 222 and battery contact switch 230 are closed, while the AC port switch 228 is open, thereby disabling the front-end rectifier 226, the first inverter 204, second inverter 206. As a result, from a front function point of view, the first inverter 204, and the second inverter 206, winding machine 208 and front-end rectifier 226 are removed from the drive circuit. The battery 202 is thus connected directly to the DC port 212. Power can flow between the battery 202 and the universal charger 210 in either direction via the current flow path 702 shown in FIG. 7.

Figure 8:
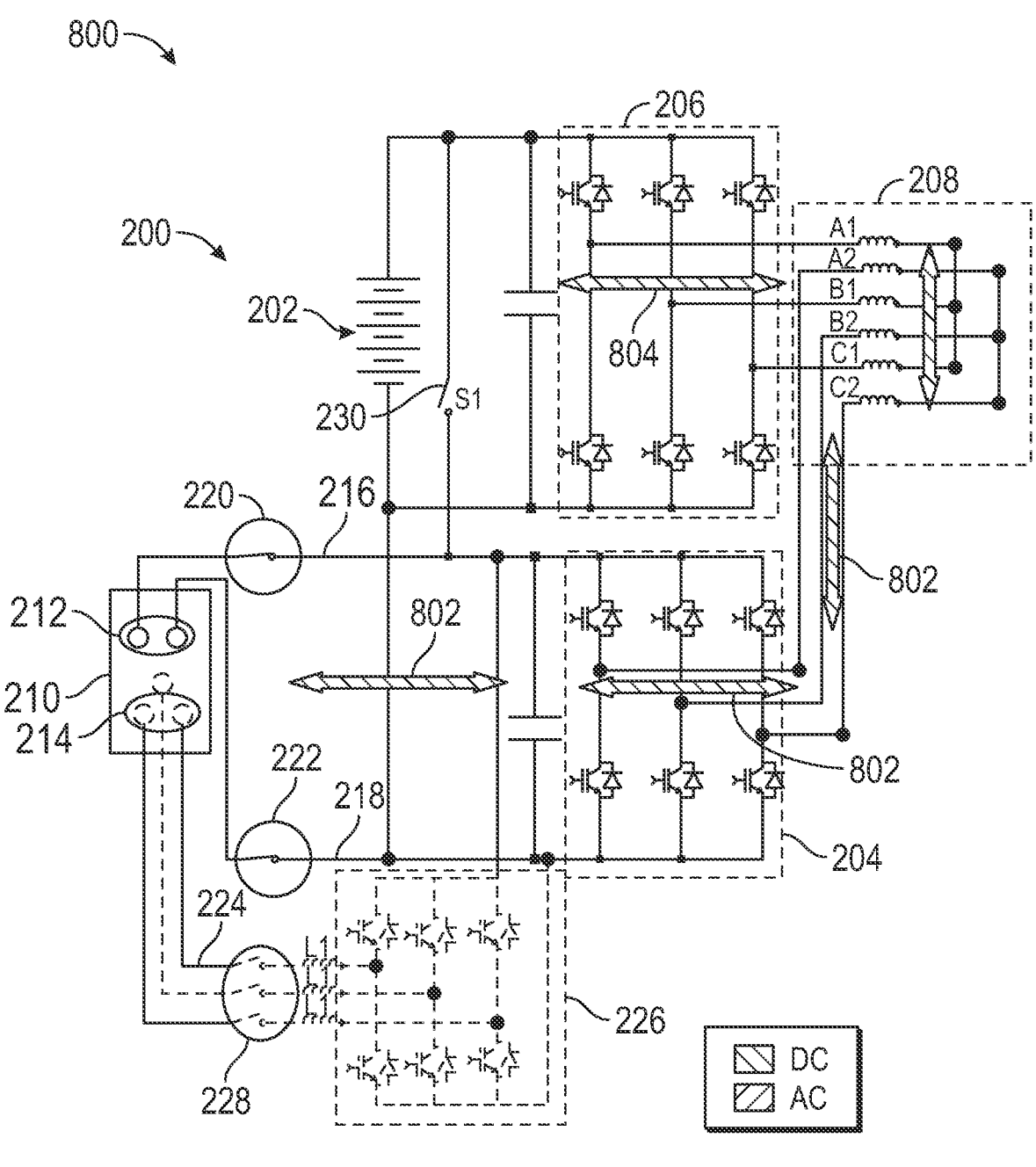
FIG. 8 shows a second DC configuration of the drive circuit for transferring power between the battery and the universal charger via the DC port.

FIG. 8 shows a second DC configuration 800 of the drive circuit 200 for transferring power between the battery 202 and the universal charger 210 via the DC port 212. The controller 110 or processor selects the second DC configuration 800 when DC power transfer is desired and when the voltage of the battery 202 is different from the voltage of the DC port 212. In the second DC configuration 800, the first DC port switch 220 and second DC port switch 222 are closed, while the battery contact switch 230 and the AC port switch 228 are open. As a result, from a function point of view, the first inverter 204, second inverter 206 and winding machine 208 are included in the drive circuit 200, while the front-end rectifier 226 is not included in the drive circuit.

The current can flow through the circuit in either direction as indicated by grid-side DC current 802 and battery-side DC current 804 in FIG. 8. The first inverter 204 and second inverter 206 are used as dual active bridge DC-DC converters. The grid-side DC current 802 flows between the first inverter 204 and grid-side winding of the winding machine 208, which includes a first set of coils. The grid-side DC current 802 flows between the second inverter 206 and a battery-side winding of the winding machine 208, which includes a second set of coils. The first set of coils and the second set of coils enable the winding machine 208 to act as a transformer that galvanically isolates the battery-side DC current 804 from the grid-side DC current 802. Power can flow through the winding machine 208 in either direction between the battery 202 and the DC port 212.

Figure 9:
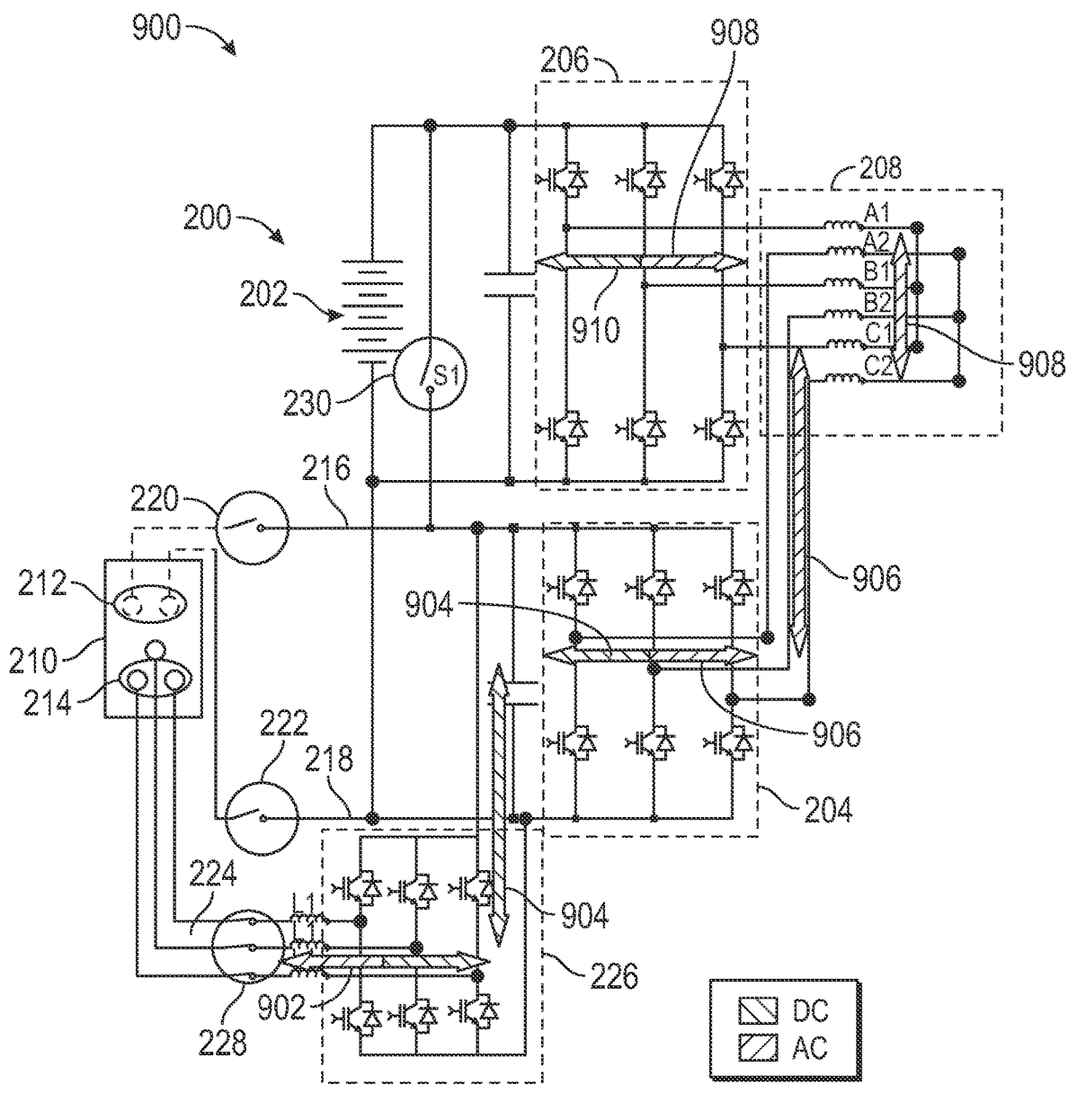
FIG. 9 shows an AC configuration of the drive circuit for transferring power between the battery and the external power grid via the AC port.

FIG. 9 shows an AC configuration 900 of the drive circuit 200 for transferring power between the battery 202 and the external power grid 108 via the AC port 214. In the AC configuration 900, the battery contact switch 230 is open, the first DC port switch 220 and the second DC port switch 222 are open. The AC port switch 228 is closed, thereby connecting the front-end rectifier 226 to the AC port 214.

In one embodiment, AC power is transferred from the external power grid 108 to the electric vehicle 100. AC current 902 flows from the AC port 214 to the front-end rectifier 226. The front-end rectifier 226 converts the AC current 902 to DC current 904, which flows to the first inverter 204. The first inverter 204 converts the DC current 904 to a grid-side AC current 906, which flows to the winding machine 208. At the winding machine 208, the grid-side AC current 906 flows through the grid-side windings (i.e., the first set of coils) to induce a battery-side AC current 908 in the battery-side winding (i.e., the second set of coils). The battery-side AC current 908 flows to the second inverter 206, which converts the battery-side AC current to a DC current 910 which is used to charge the battery 202.

In another embodiment, AC power is transferred from the electric vehicle 100 to the external power grid 108. DC current 910 flows from the battery 202 to the second inverter 206. The second inverter 206 converts the DC current 910 to a battery-side AC current 908 that is sent to the winding machine 208. At the winding machine 208, the battery-side AC current 908 flows through the battery-side winding (i.e., the second set of coils) to induce a grid-side AC current 906 in the grid-side winging (i.e., the first set of coils). The grid-side AC current 906 is sent to the first inverter 204 which converts the grid-side AC current to a DC current 904. The DC current 904 is sent from the first inverter 204 to the front-end rectifier 226. The front-end rectifier 226 converts the DC current 904 to AC current 902, which flows to the AC port 214.

Figure 10:
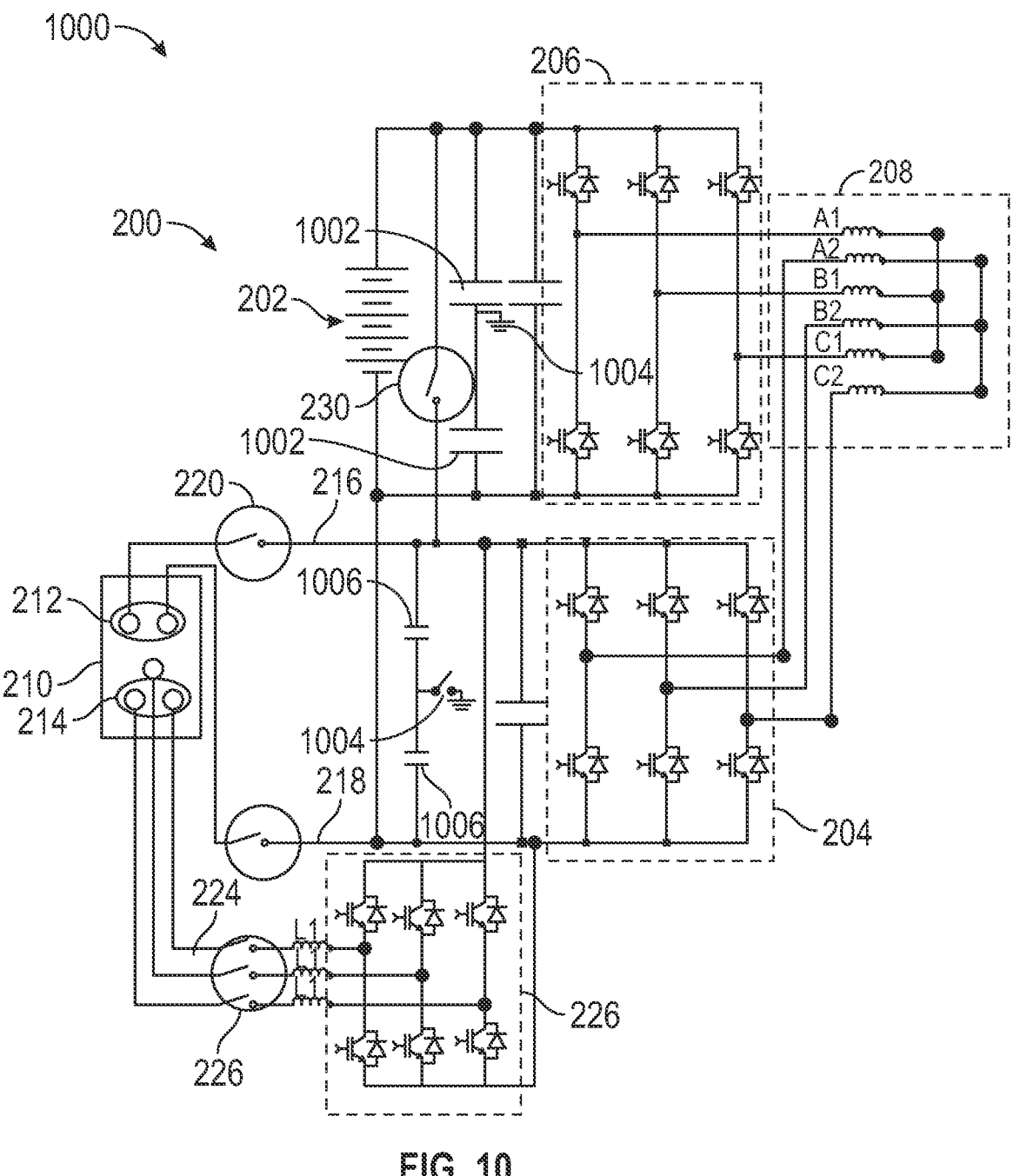
FIG. 10 shows a diagram depicting the drive circuit in an alternative embodiment.

FIG. 10 shows a diagram 1000 depicting the drive circuit 200 in an alternative embodiment. A first set 1002 of Y-capacitors extends across the poles of the battery 202 to isolate the second inverter 206 from ground 1004. Also, a second set 1006 of Y-capacitors are located between the high voltage DC bus 216 and the low voltage DC bus 218 to isolate the first inverter 204 from ground 1004. The first set 1002 and the second set 1006 further provide electric isolation across the winding machine 208.

Figure 11:
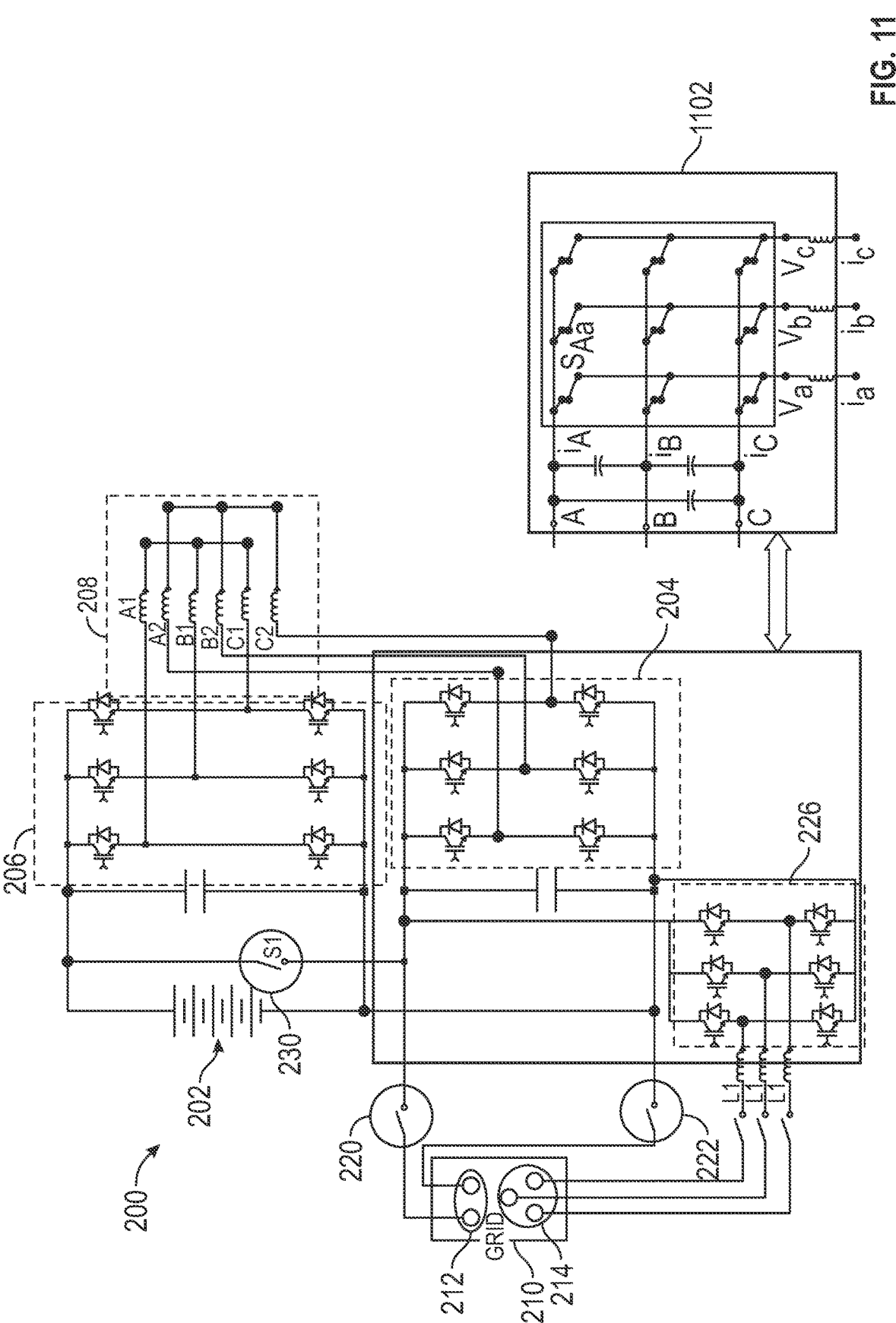
FIG. 11 shows the drive circuit in another alternative embodiment.

FIG. 11 shows a matrix converter that can be used within the drive circuit 200 in an embodiment. The matrix converter 1102 converts an AC current to an AC current and can be inserted into the drive circuit 200 to replace the front-end rectifier 226 and the first inverter 204. For a three-phase winding, the matrix converter 1102 can operate using 9 switches, instead of the 12 switches it replaces (i.e., the 6 transistors of the front-end rectifier 266 and the 6 transistors of the first inverter 204). When the matrix converter 1102 is used, input inductors L1 are not necessary.

Figure 12:
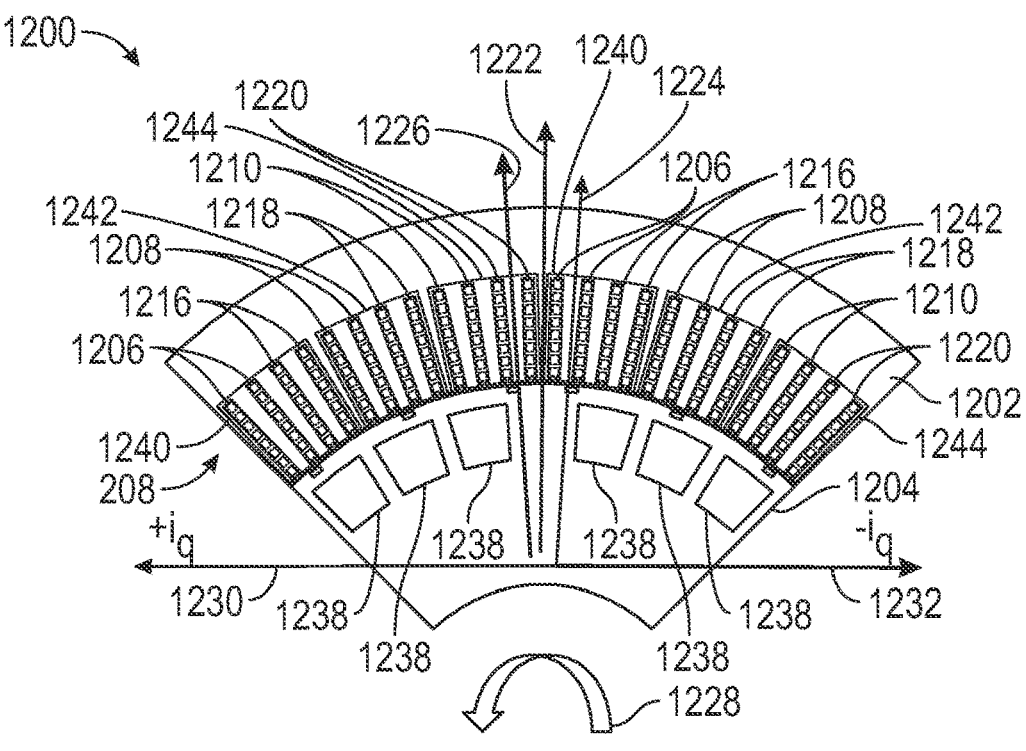
FIG. 12 shows a diagram depicting the winding machine along a longitudinal axis, in an embodiment.

FIG. 12 shows a diagram 1200 depicting the winding machine 208 along a longitudinal axis, in an embodiment. In an embodiment, the winding machine 208 is a three-phase permanent magnet motor and includes a stator 1202 and a rotor 1204. The rotor 1204 includes one or more permanent magnets 1238 forming a D-axis 1222 (direct axis). The stator 1202 includes grid-side windings including a first set of coils and battery side windings including a second set of coils. The first of coils and the second set of coils are interleaved between each other. Since the winding machine 208 is a three-phase permanent magnet motor, the grid-side windings includes a first grid-side coil 1206, second grid-side coil 1208, and third grid-side coil 1210 and the battery-side winding includes a first battery-side coil 1216, a second battery-side coil 1218 and a third battery-side coil 1220.

The first grid-side coil 1206 and the first battery-side coil 1216 form a first galvanic pair 1240. The second grid-side coil 1208 and the second battery-side coil 1218 form a second galvanic pair 1244. The third grid-side coil 1210 and the third battery-side coil 1220 winding W2 form a third galvanic pair 1246. An A-axis is an axis of flux for a coil. A first A-axis 1224 is shown for the grid side windings and a second A-axis 1226 is shown for the battery-side windings. A rotation direction 1228 for the rotor 1204 is shown. The grid-side winding consumes power from the grid using $+i_q$ 1230. The battery-side winding W2 delivers power to the battery using $-i_q$ 1232.

Figure 13:
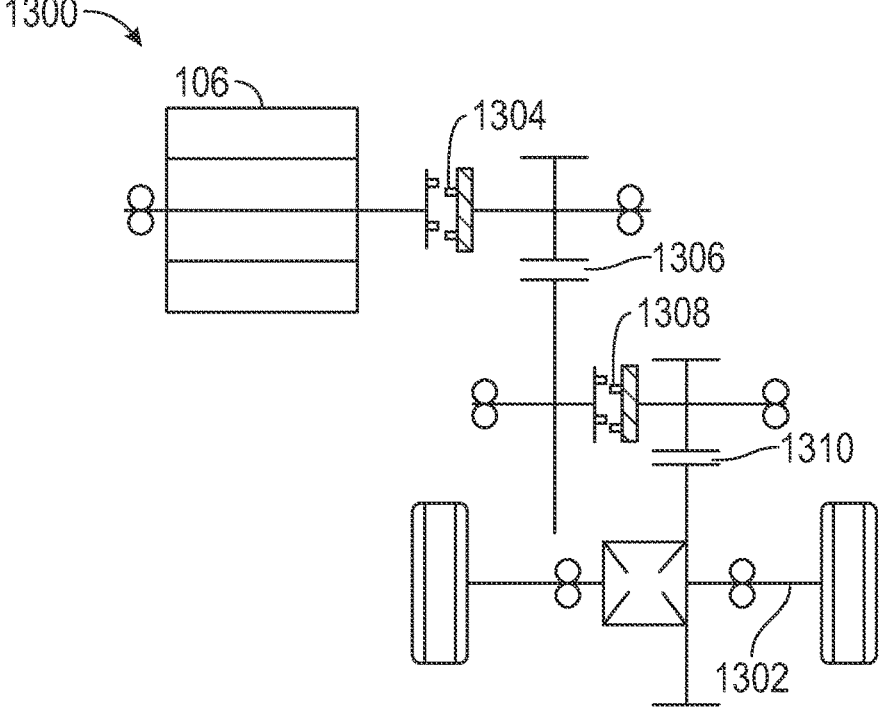
FIG. 13 shows a schematic diagram of a transmission system of the electric vehicle.

FIG. 13 shows a schematic diagram 1300 of a transmission system of the electric vehicle 100. When power is being transferred into or out of the electric vehicle 100, the electric motor 106 (i.e., the winding machine 208) is to be disconnected from the rest of the vehicle so that a rotation of the electric motor during power transfer does not cause the vehicle to move. The electric motor 106 is shown to be connected to an axle 1302 of the electric vehicle 100 via a first clutch 1304, a first gearset 1306, a second clutch 1308, and a second gearset 1310. The first clutch 1304 can be disengaged to separate the winding machine 208 from the rest of the electric vehicle 100.

Figure 14:
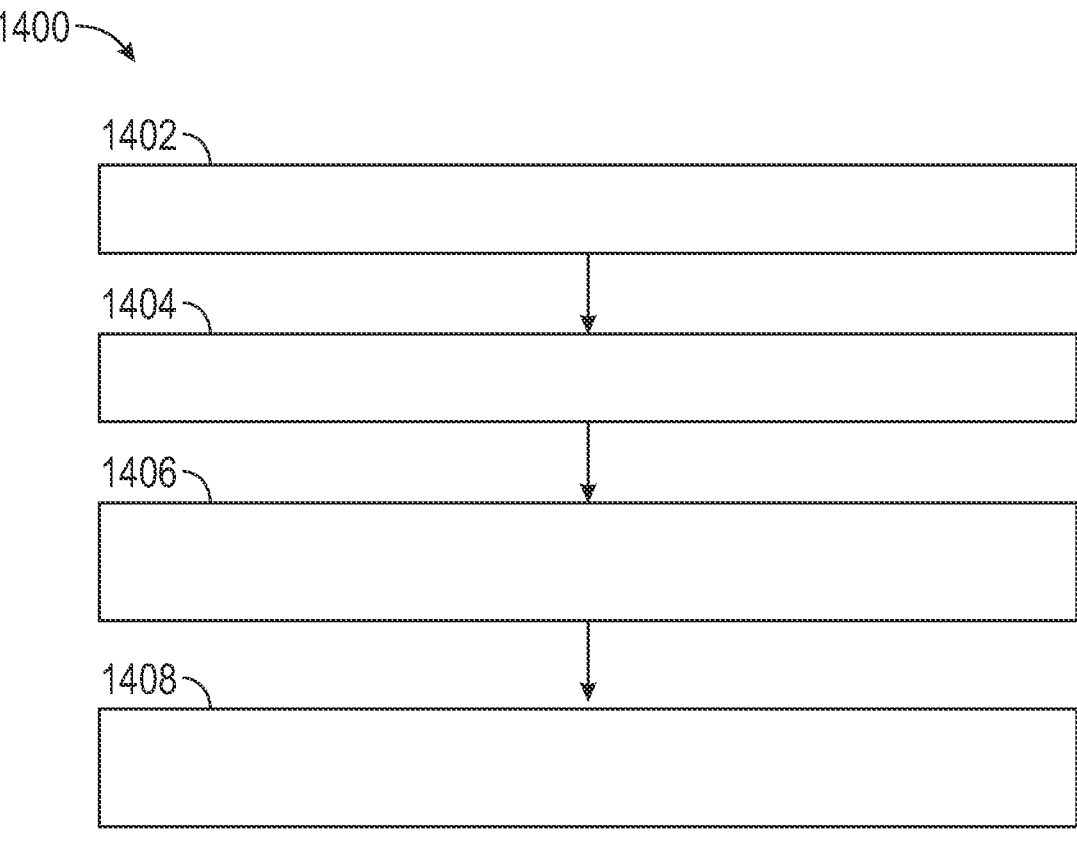
FIG. 14 is a flowchart of a method of preparing the vehicle for use of the electric motor for the purposes of power transfer.

FIG. 14 is a flowchart 1400 of a method of preparing the vehicle for use of the electric motor 106 for the purposes of power transfer. In box 1402, the vehicle is engaged in park. In box 1404, the electric motor 106 is disconnected from the rest of the vehicle, such as by disengaging the first clutch 1304. In box 1406, a power level, speed and operating frequency for the power transfer is selected. In box 1408, the winding machine is used to for power transfer.

Figure 15:
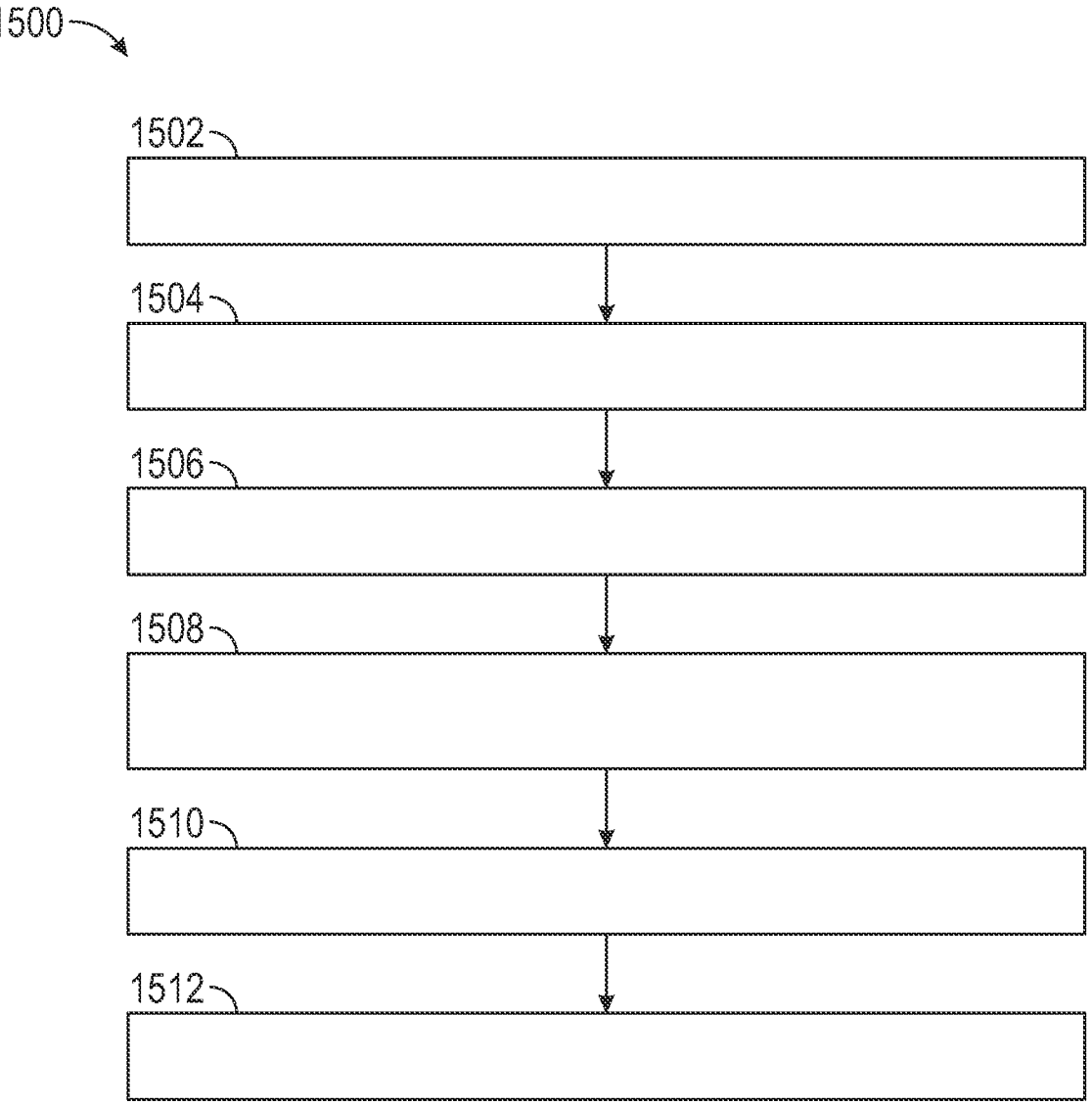
FIG. 15 is a flowchart of a method for reconnecting the electric motor to the vehicle for drive purposes.

FIG. 15 is a flowchart 1500 of a method for reconnecting the electric motor 106 to the vehicle for drive purposes. In box 1502, power transfer between the vehicle and the external power grid is stopped. In box 1504, the electric motor is switched to a motoring mode using either the first inverter (powered externally) or the second inverter (powered by the battery). In box 1506, the speed of the electric motor 106 is brought down or reduced to recover kinematic energy of the electric motor. In box 1508, the clutch is engaged when the speed of the electric motor drops to less than a selected speed threshold. In box 1510, the battery contact switch 230 is opened to discharge the high voltage DC bus. In box 1512, the vehicle returns to a safe mechanical and electrical state.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of transferring power between a vehicle and an external power grid, comprising:
   connecting a rectifier between an alternating current (AC) port of an outlet of the external power grid and a first inverter of the vehicle, wherein the vehicle includes the first inverter, a winding machine and a second inverter for DC power transfer; and
   converting between an AC power at the AC port on a grid side of the rectifier and a direct current (DC) power at a vehicle side of the rectifier to transfer power bi-directionally between the external power grid and the vehicle; and
   using the first inverter, the winding machine, and the second inverter for AC power transfer.

2. The method of claim 1, further comprising disconnecting the rectifier from the AC port and connecting the first inverter to a DC port of the outlet for DC power transfer.

3. The method of claim 1, wherein the winding machine is an electric motor of the vehicle and the method further comprises disengaging the electric motor from the vehicle for power transfer.

4. The method of claim 1, further comprising connecting a drive system of the vehicle between the AC port and the first inverter and using an inverter of the drive system as the rectifier and a machine winding of the motor drive as an inductor.

5. The method of claim 4, wherein the inverter of the motor drive is a multi-phase inverter, the method further comprising operating the inverter of the motor drive in one of: (i) a three-phase configuration; and (ii) a single-phase configuration.

6. A drive system of an electric vehicle, comprising:
a battery;
a rectifier;
a first inverter;
a second inverter for DC power transfer;
a winding machine; and
a processor configured to connect the rectifier between an alternating current (AC) port of an outlet of an external power grid and the first inverter, the rectifier configured to convert between an AC power at the AC port on a grid side of the rectifier and a direct current (DC) power at a vehicle side of the rectifier in order to transfer power bi-directionally between the external power grid and the battery, wherein connecting the rectifier between the AC port and the first inverter allows AC power transfer using the first inverter, the winding machine, and the second inverter.

7. The drive system of claim 6, wherein the processor is further configured to disconnect the rectifier from the AC port and connect the first inverter to a DC port of the outlet to allow DC power transfer.

8. The drive system of claim 6, wherein the winding machine is an electric motor of the electric vehicle and the processor is further configured to disengage the electric motor from the electric vehicle for power transfer.

9. The drive system of claim 6, further comprising a second drive system located in series between the AC port and the first inverter, wherein an inverter of the second drive system is used as the rectifier and a machine winding of the second drive system is used as an inductor between the AC port and the rectifier.

10. The drive system of claim 9, wherein the inverter of the second drive system, is a multi-phase inverter operated in one of: (i) the three-phase configuration; and (ii) a single-phase configuration.

11. The drive system of claim 6, further comprising one of: (i) the first inverter coupled to the rectifier; and (ii) a matrix converter in lieu of the rectifier and the first inverter.

12. An electric vehicle, comprising:
a battery;
a rectifier;
a first inverter;
a second inverter for DC power transfer;
a winding machine; and
a processor configured to connect the rectifier between an alternating current (AC) port of an outlet of an external power grid and the battery, the rectifier configured to convert between an AC power at the AC port on a grid side of the rectifier and a direct current (DC) power at a vehicle side of the rectifier in order to transfer power bi-directionally between the external power grid and the battery, wherein connecting the rectifier between the AC port and the first inverter allows AC power transfer using the first inverter, the winding machine, and the second inverter.

13. The electric vehicle of claim 12, wherein the processor is further configured to disconnect the rectifier from the AC port and connect the first inverter to a DC port of the outlet to allow DC power transfer.

14. The electric vehicle of claim 12, wherein the winding machine is an electric motor of the vehicle and the processor is further configured to disengage the electric motor from the vehicle for power transfer.

15. The electric vehicle of claim 12, further comprising a drive system located in series between the AC port and the first inverter, wherein an inverter of the drive system is used as the rectifier and a machine winding of the drive system is used as an inductor between the AC port and the rectifier.

16. The electric vehicle of claim 15, wherein the inverter of the drive system is a multi-phase inverter operated in one of: (i) a three-phase configuration; and (ii) a single-phase configuration.

17. The electric vehicle of claim 12, further comprising one of: (i) the first inverter coupled to the rectifier; and (ii) a matrix converter in lieu of the rectifier and the first inverter.

18. The method of claim 1, further comprising disengaging a clutch between the winding machine and the vehicle during AC power transfer.

19. The drive system of claim 6, wherein the processor is further configured to disengage a clutch between the winding machine and the vehicle during AC power transfer.

20. The electric vehicle of claim 12, wherein the processor is further configured to disengage a clutch between the winding machine and the vehicle during AC power transfer.

* * * * *